(12) United States Patent
Altaras et al.

(10) Patent No.: US 10,109,998 B2
(45) Date of Patent: Oct. 23, 2018

(54) ESD PROTECTION CIRCUIT WITH TWO DISCHARGE TIME PERIODS

(71) Applicant: SanDisk Technologies Inc., Plano, TX (US)

(72) Inventors: Moti Altaras, Omer (IL); Alex Tetelbaum, Beer Sheva (IL); Tomer Elran, Petah Tikva (IL); Mark Moty Groissman, Beer Sheva (IL)

(73) Assignee: SanDisk Technologies LLC, Plano, TX (US)

( * ) Notice: Subject to any disclaimer, the term of this patent is extended or adjusted under 35 U.S.C. 154(b) by 303 days.

(21) Appl. No.: 14/928,815

(22) Filed: Oct. 30, 2015

(65) Prior Publication Data

US 2017/0126001 A1 May 4, 2017

(51) Int. Cl.
*H02H 9/00* (2006.01)
*H02H 9/04* (2006.01)

(52) U.S. Cl.
CPC .................................. *H02H 9/04* (2013.01)

(58) Field of Classification Search
CPC ....................................................... H02H 9/04
See application file for complete search history.

(56) References Cited

U.S. PATENT DOCUMENTS

| 7,518,846 | B1 | 4/2009 | Meyer | |
|---|---|---|---|---|
| 8,649,134 | B2 | 2/2014 | Smith | |
| 8,681,461 | B2 * | 3/2014 | Shrivastava | H02H 9/046 361/111 |
| 2008/0007882 | A1 * | 1/2008 | Bernard | H02H 9/046 361/56 |
| 2015/0270258 | A1 | 9/2015 | Dabral et al. | |

OTHER PUBLICATIONS

International Search Report and Written Opinion for corresponding application PCT/2016/051846 dated Dec. 9, 2016.

\* cited by examiner

*Primary Examiner* — Stephen W Jackson
(74) *Attorney, Agent, or Firm* — Brinks Gilson & Lione (57) ABSTRACT

An electrostatic discharge protection circuit may include discharge path circuitry to discharge charge on a supply line in response to detection of an ESD event. The charge on the supply line may be discharged through the discharge path circuitry from when a first timing window opens until a second timing window closes. The first timing window may also be used to detect ESD events. The two timing windows may allow an initial period of the ESD voltage on the supply line to be suppressed before the second timing window opens, and may further allow a remaining period of the ESD event following the initial period to be suppressed after the first timing window closes.

19 Claims, 6 Drawing Sheets

ESD PROTECTION CIRCUIT WITH TWO DISCHARGE TIME PERIODS

BACKGROUND

Electrostatic discharge (ESD) events may involve a sudden flow of electricity between two electrically charged objects caused by contact, an electrical short, or a dielectric breakdown. When an ESD event occurs, an accumulation of charge from the sudden flow of electricity may generate an ESD voltage that may peak at a relatively high level, which may cause damage to electronic circuits. Electronic devices may include ESD protection circuitry to protect against the harmful effects of ESD events.

Some ESD protection circuits may protect against ESD events by discharging charge generated during an ESD event in order to suppress the ESD voltage to safe levels. In addition, some ESD protection circuits may utilize a timing window to initially detect an ESD event. The timing window may be relatively short so that the ESD protection circuit can differentiate an ESD event from other transient events that do not change as rapidly and that should not be suppressed. A timing window may also be used to determine how long the ESD protection circuitry is to discharge charge if an ESD event is detected. The timing window used for detection may be too small to set the duration of discharge. At the same time, using additional circuitry to set a second timing window for discharge may require a delay between detection and discharge, which in turn may cause an initial portion of the ESD voltage to be inadequately suppressed since ESD events happen so quickly. ESD protection circuitry that adequately suppresses ESD voltage as early as possible and over as long of a duration of the ESD event as possible may be desirable.

BRIEF DESCRIPTION OF THE DRAWINGS

The accompanying drawings, which are incorporated in and constitute a part of this specification illustrate various aspects of the invention and together with the description, serve to explain its principles. Wherever convenient, the same reference numbers will be used throughout the drawings to refer to the same or like elements.

DETAILED DESCRIPTION OF THE PRESENTLY PREFERRED EMBODIMENTS

Overview

By way of introduction, the below embodiments relate to electrostatic discharge (ESD) protection circuits that uses two time periods or timing windows to discharge charge when an ESD event occurs. In a first example embodiment, an electrostatic discharge (ESD) protection circuit may include discharge path circuitry coupled to a supply line and a ground reference, a detection circuit, and activation circuitry. The detection circuit maybe configured to detect an ESD event occurring on the supply line, and generate a detection voltage above a detection level for a first time period in response to detection of the ESD event. The activation circuitry, when activated, may be configured to cause the discharge path circuitry to discharge charge on the supply line to the ground reference, where the activation circuitry is configured to be activated for the first time period and a second time period that ends after the first time period ends.

In some example embodiments, the discharge path circuitry may include a first discharge path circuit and a second discharge path circuit. The activation circuitry mauy include a first activation circuit and a second activation circuit. When the detection circuit detects the ESD event, the first activation circuit may be configured to generate an activation voltage at an activation level to cause the first discharge path circuit to discharge charge and to activate the second activation circuit for the first time period. In addition, when the second activation circuit is activated, the second activation circuit may be configured to cause the second discharge path circuit to discharge charge for the second time period.

In some example embodiments, the first discharge path circuit may include a first transistor and the second activation circuit may include a second transistor. The activation voltage at the activation level may turn on each of the first transistor to cause the first discharge path to discharge charge and the second transistor to activate the second activation circuit.

In some example embodiments, the second activation circuit may further include a node connected to the second transistor. The first activation circuit may further be configured to generate the activation voltage below the activation level when the first time period expires. The first and second transistors may be configured to turn off in response to the activation voltage being generated below the activation level, and when the second transistor turns off, a voltage generated at the node may cause the second discharge path to discharge charge for the second time period.

In some example embodiments, the voltage generated at the node may cause the second discharge path to be deactivated upon expiration of the second time period.

In some example embodiments, the first activation circuit may be configured to begin causing the first discharge path circuit to discharge charge before the second activation circuit is configured to begin causing the second discharge path to discharge charge.

In some example embodiments, the activation circuitry may include a first activation circuit, a second activation circuit, and a third activation circuit. When the detection circuit generates the detection voltage above the detection level, the third activation circuit may be configured to cause the discharge path circuitry to discharge charge for the first time period, the first activation circuit may be configured to activate the second activation circuit, and the second activation circuit, upon being activated, may be configured to cause the discharge path circuitry to discharge charge for the second time period.

In some example embodiments, the third activation circuit, upon being activated, may be configured to generate an activation voltage at an activation level on a node to cause the discharge path circuitry to discharge charge. In addition, the second activation circuit, upon being activated, may be configured to generate the activation voltage at the activation level on the node to cause the discharge path circuitry to discharge the charge.

In some example embodiments, the second activation circuit may be configured to maintain the activation voltage on the node at the activation level until the second time period ends when the first time period ends and the third activation circuit is no longer configured to generate the activation voltage at the activation level.

In some example embodiments, the third activation circuit may include a first transistor to pull up the activation voltage on the node. In addition, the second activation circuit may include a second transistor configured to turn off when the detection circuit generates the detection voltage above the detection level. When turned off, the second transistor may prevent a third transistor of the second activation circuit from pulling down the activation voltage on the node.

In some example embodiments, the node is a first node, and the detection circuit may be configured to generate the detection voltage between a second node and the supply line. The first transistor and the second transistor may each have a terminal coupled to the second node.

In a second example embodiments, an electrostatic discharge (ESD) protection circuit may include a first discharge path and a second discharge path, each configured to, when activated, discharge charge accumulated on a supply line to a ground reference. The ESD protection circuit may further include a detection circuit configured to generate a detection voltage above a detection level in response to detection of an ESD event on the supply line. The ESD protection circuit may also include activation circuitry comprising a first activation circuit and a second activation circuit. The first activation circuit may be configured to be activated when the detection circuit generates the detection voltage above the detection level. When activated, the first activation circuitry may be configured to generate a first activation voltage at a first activation level to activate each of the first discharge path and the second activation circuit. In addition, the second activation circuit, upon being activated, may be configured to generate a second activation voltage at a second activation level to activate the second discharge path.

In some example embodiments, the first activation circuit may be configured to generate the first activation voltage at the first activation level during a timing window.

In some example embodiments, the detection circuit may include a resistor and a capacitor. A duration of the timing window may be based on a resistance of the resistor and a capacitance of the capacitor.

In some example embodiments, the detection circuit may be configured to generate the detection voltage to deactivate the first activation circuit when the timing window closes. The first activation circuit, upon being deactivated, may be configured to generate the first activation voltage at a deactivation level and provide the first activation voltage at the deactivation level to each of the first discharge path and the second activation circuit. Also, the first discharge path may be configured to be deactivated in response to receipt of the first activation voltage at the deactivation level. Further, the second activation circuit may be configured to remain activated to activate the second discharge path for a time period in response to receipt of the second activation voltage at the deactivation level.

In some example embodiments, the second activation circuit may include a resistor connected in parallel with a capacitor. A duration of the time period that the second activation circuit is configured to remain activated may depend on a resistance of the resistor and a capacitance of the capacitor.

In some example embodiments, the first discharge path may include a first transistor having a first gate width and the second discharge path may include a second transistor having a second gate width. A ratio of the second width to a sum of the first gate width and the second gate width may correspond to a percentage in a range of between 70-80%.

In a third example embodiment, a method of responding to an electrostatic discharge (ESD) event may be performed. The method may include: generating, with a first activation circuit, a first activation voltage to cause discharge path circuitry to discharge charge on a supply line in order to suppress an ESD voltage for a first time period; generating, with a second activation circuit, a second activation voltage to cause the discharge path circuitry to discharge charge on the supply line in order to suppress the ESD voltage for a second time period; and in response to generating the first and second activation voltages, discharging, with the discharge path circuitry, charge on the supply line from a beginning of the first time period to an end of the second time period.

In some example embodiments, the method may include: applying, with the first activation circuit, the first activation voltage to a first discharge path of the discharge path circuitry to cause the first discharge path to discharge charge for the first time period; and applying, with the second activation circuit, the second activation voltage to a second discharge path of the discharge path circuitry to cause the second discharge path to discharge charge for the second time period.

In some example embodiments, the discharge path circuitry may include a single discharge path, where generating the second activation voltage may include generating, with the second activation circuit, the second activation voltage on a same node on which the first activation voltage is generated. The method may further include maintaining, with the second activation circuit, application of the second activation voltage on the node after the first time period expires until the end of the second time period.

Other embodiments are possible, and each of the embodiments can be used alone or together in combination. Accordingly, various embodiments will now be described with reference to the attached drawings.

Exemplary Embodiments

The present description describes electrostatic discharge (ESD) protection circuits and related methods for suppressing an ESD voltage generated on a supply line as a result of an ESD event. The supply line may be configured to supply a supply voltage from a supply voltage source device to a supply voltage destination device. The supply voltage may be used to power electronic components of the supply destination device.

In general, an ESD event may be a sudden flow of electricity between two electrically charged objects caused by contact, an electrical short, or a dielectric breakdown. When an ESD event occurs on the supply line, an accumulation of charge from the sudden flow of electricity may generate an ESD voltage on the supply line that may peak at a relatively high level, such as a voltage in the kilovolt (kV) range. Such a high voltage level may cause damage to the supply voltage host and/or destination devices.

The ESD protection circuit may be coupled to the supply line in order to protect the supply voltage source and/or destination devices from the high level of the ESD voltage. The ESD protection circuit may do so by suppressing the ESD voltage to a sufficiently low level during the ESD event so that the ESD voltage does not cause damage to the supply voltage source and/or destination device. In particular, the ESD protection circuit may discharge charge accumulated during the ESD event to ground in order to lower the level of the ESD voltage.

The ESD voltage may be a transient voltage in that its voltage level changes during the ESD event. However, the ESD voltage may not be the only transient voltage generated on the supply line. The supply voltage may also be a transient voltage, at least during an initial power-up time period during when the level of the supply voltage transitions from an initial level (e.g., 0 V) to its final or steady-state supply level. While it may be desirable for the ESD protection circuit to suppress the ESD voltage on the supply line, it may not be desirable for the ESD protection circuit to suppress transient voltages that are desired to be generated on the supply line, such as the supply voltage during power up.

The ESD protection circuit may include detection circuitry that is configured to detect an ESD event and differentiate ESD events from other transient events for which voltage suppression is not desired, such as power up. If the detection circuitry detects an ESD event occurring on the supply line, discharge circuitry of the ESD protection circuit may be activated in order to discharge charge on the supply line to suppress the ESD voltage. Alternatively, if the detection circuitry does not detect an ESD event or detects that a transient event occurring on the supply line is not or does not exhibit the characteristics of an ESD event, the discharge circuitry may remain deactivated such that voltage suppression on the supply line does not occur.

ESD voltages may differ from other transient voltages on the supply line, such as the supply voltage during power up, in that its voltage level may change or transition faster. Otherwise stated, the ESD voltage may have a higher frequency than the other transient voltages that are not desired to be suppressed. The detection circuitry may be configured to differentiate ESD events from other transient events by detecting a rate or how fast a voltage level of a transient voltage on the supply line is changing. If the detection circuitry detects that the voltage level of the transient voltage is changing fast enough to qualify as an ESD voltage, then the discharge circuitry may be activated in order to discharge charge on the supply line. Alternatively, if the detection circuitry detects that the voltage level of the transient voltage is changing too slowly to qualify as an ESD voltage, then the discharge circuitry may remain deactivated such that voltage suppression on the supply line does not occur.

The detection circuitry may use a timing window or time period to differentiate between ESD events and other transient events. Transient events falling or occurring within the timing window may be identified as ESD events to be suppressed, and transient events falling or occurring outside of the timing window may be identified as non-ESD transient events that are not to be suppressed. Accordingly, the timing window may be set long enough so that an initial spike or rise in an ESD voltage falls or occurs within the timing window, but short enough so that the initial power-up transition of the supply voltage falls or occurs outside the timing window.

Even though an initial spike or rise in the ESD voltage may occur within the timing window, the ESD event may still be occurring when the timing window closes. Some example ESD protection circuits may use a second timing window during which to discharge charge on the supply line. That is, these example ESD protection circuits may include a first-stage detection circuit that utilizes a first timing window to detect ESD events, and a second-stage discharging circuit that utilizes a second timing window that determines how long the ESD protection circuit discharges charge on the supply line. However, in these example ESD protection circuits, some delay may exist from the time that the detection circuitry detects an ESD event to the time that the second stage begins discharging charge on the supply line. During this period of delay, the ESD voltage may rise to a potentially damaging level, and the ESD protection circuits may not be capable of suppressing it.

The present description describes ESD protection circuits that utilize two time periods to discharge charge through one or more discharge paths on the supply line in response to detection of an ESD event. A first of the two timing windows may also be used to detect ESD events. The second timing window may be of a sufficient duration so that it is open after the first timing window closes. Use of the two timing windows may allow an initial period of the ESD voltage on the supply line to be suppressed before the second timing window opens, and may further allow a remaining period of the ESD event following the initial period to be suppressed after the first timing window closes. This may allow the ESD protection circuit to begin suppressing an ESD voltage as quickly as possible and for an overall longer duration compared to other ESD protection circuit configurations that utilize only a single time period for ESD suppression.

Figure 1:
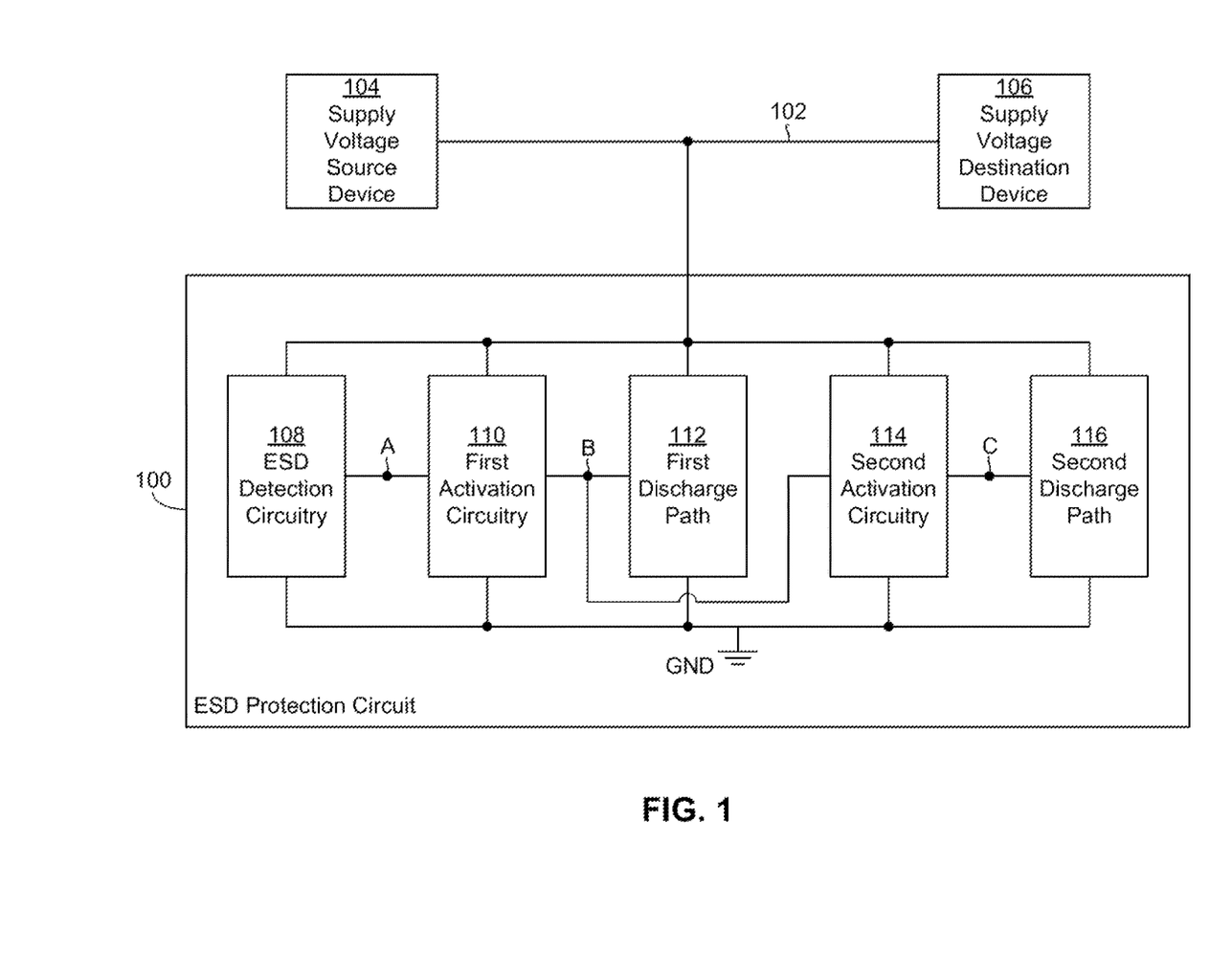
FIG. 1 is a block diagram of an example electrostatic discharge protection circuit coupled to a supply line.

FIG. 1 shows a block diagram of an example ESD protection circuit 100 coupled to a supply line 102 that is configured to supply a supply voltage from a supply voltage source device 104 to a supply voltage destination device 106. Example supply voltage source and destination devices 104, 106 may be respectively a host system and a non-volatile memory system, where, in addition to the host and non-volatile memory system communicating host commands and responses related to data storage in the non-volatile memory system, the host is configured to power the non-volatile memory system by supplying the supply voltage on the supply line 102. Other example supply voltage source and destination devices 104, 106 may be possible. The ESD protection circuit 100 may include ESD detection circuitry 108, first activation circuitry 110, a first discharge path 112, second activation circuitry 114, and a second discharge path 116. As shown in FIG. 1, each of the ESD detection circuitry 108, the first and second activation circuitry 110, 114, and the first and second discharge paths 112, 116 may be coupled to the supply line 102 and to a ground reference GND.

The ESD detection circuitry 108 may be configured to detect whether a transient voltage on the supply line 102 occurs within a first timing window or time period. If a transient voltage within the first timing window does occur, then the transient voltage may be indicative of an ESD voltage generated as a result of an ESD event. In response, the ESD detection circuitry 108 may generate a voltage at a node A with respect to ground that yields a detection voltage between the supply line 102 and node A that is above a detection level. The detection voltage being above the detection level may activate the first activation circuitry 110. Prior to the detection, a level of the detection voltage may be below the detection level such that the first activation circuitry 110 is deactivated.

In some example configurations, the ESD detection circuitry 108 may be configured as a low pass filter or exhibit low pass filter characteristics. If the frequency of the transient voltage is high enough to be indicative of an ESD voltage, then the low pass filter characteristics of the ESD detection circuitry 108 may "reject" the transient voltage and generate a relatively low voltage at node A such that the voltage difference between the supply line 102 and node A is above the detection level to activate the first activation circuitry 110. Alternatively, if the frequency of the transient voltage is too slow to be indicative of an ESD voltage, then the low pass filter characteristics of the ESD detection circuitry 108 may "pass" the transient voltage and generate a relatively high voltage at node A such that the voltage difference between the supply line 102 and node A is below the detection level.

In response to being activated, the first activation circuitry 110 may generate a first activation voltage (relative to the ground reference GND) at a node B. As shown in FIG. 1, the first activation voltage generated at node B may be provided to the first discharge path 112 and also to the second activation circuitry 114. When the first activation circuitry 110 is activated in response to the detection voltage being generated above the detection level, the first activation voltage may generate the first activation voltage at a level that activates the first discharge path 112 and the second activation circuitry 114.

The first discharge path 112 may be configured to transition between an activated state and a deactivated state. When activated (or configured in the activated state), the first discharge path 112 may effectively operate as a short circuit and couple the supply line 102 to the ground reference GND. As a result, charge accumulated on the supply line 102 may discharge to the ground reference GND via the first discharge path 112. The discharge of the charge through the first discharge path 112 may suppress the level of the ESD voltage on the supply line 102. Alternatively, when deactivated (or configured in the deactivated state), the first discharge path 112 may effectively operate as an open circuit between the supply line 102 and the ground reference GND. When configured in the deactivated state, charge accumulated on the supply line 102 may not discharge to the ground reference GND via the first discharge path 112.

In addition, when the second activation circuitry 114 is activated, the second activation circuitry 114 may generate a second activation voltage (relative to the ground reference GND) at a node C. As shown in FIG. 1, the second activation voltage generated at node C may be provided to the second discharge path 116. Similar to the first discharge path 112, the second discharge path 116 may be configured to transition between an activated state and a deactivated state. When activated (or configured in the activated state), the second discharge path 116 may effectively operate as a short circuit and couple the supply line 102 to the ground reference GND. As a result, charge accumulated on the supply line 102 may discharge to the ground reference GND via the second discharge path 116. The discharge of the charge through the second discharge path 116 may suppress the level of the ESD voltage on the supply line 102. Alternatively, when deactivated (or configured in the deactivated state), the second discharge path 116 may effectively operate as an open circuit between the supply line 102 and the ground reference GND. When configured in the deactivated state, charge accumulated on the supply line 102 may not discharge to the ground reference GND via the second discharge path 116.

As previously described, the ESD detection circuitry 108 may detect an ESD voltage by detecting a transient voltage on the supply line 102 that occurs within a first timing window or time period. When such a transient voltage does occur within the first timing window, the ESD detection circuitry 108 may generate the detection voltage between the supply line 102 and node A above the detection level during the first timing window. When the first timing window closes (i.e., the first time period expires), the detection voltage may no longer be generated above the detection level. As such, the first activation circuitry 110 may be activated during the first timing window and may then be deactivated when the first timing window closes. In turn, the first discharge path 112 may be activated during the first timing window to discharge charge on the supply line 102 to the ground reference GND, and then may be deactivated when the first timing window closes.

The second activation circuitry 114 may be activated during a second timing window or for a second time period. In turn, during the second timing window, the second discharge path 116 may be activated to discharge charge on the supply line 102 to the ground reference GND, and then may be deactivated when the second timing window closes. In general, the first timing window may begin before the second timing window begins such that the first discharge path 112 is activated and begins discharging charge on the supply line 102 to the ground reference GND before the second discharge path 116 is activated and begins discharging charge. In addition, the second timing window may end after the first timing window ends such that when the first timing window closes and the first discharge path 112 stops discharging charge, the second timing window has not yet closed and time may still be available during which the second discharge path 116 may discharge charge. Use of a first timing window that opens shortly but quickly for ESD detection to activate the first discharge path 112 and a second timing window that stays open after the first timing window closes to activate the second discharge path 116 may allow the ESD protection circuit 100 to begin suppressing an ESD voltage of an ESD event as quickly as possible and to suppress the ESD voltage for an overall longer duration compared to other ESD protection circuit configurations that utilize only a single discharge path and/or a single time period for ESD suppression.

Figure 2:
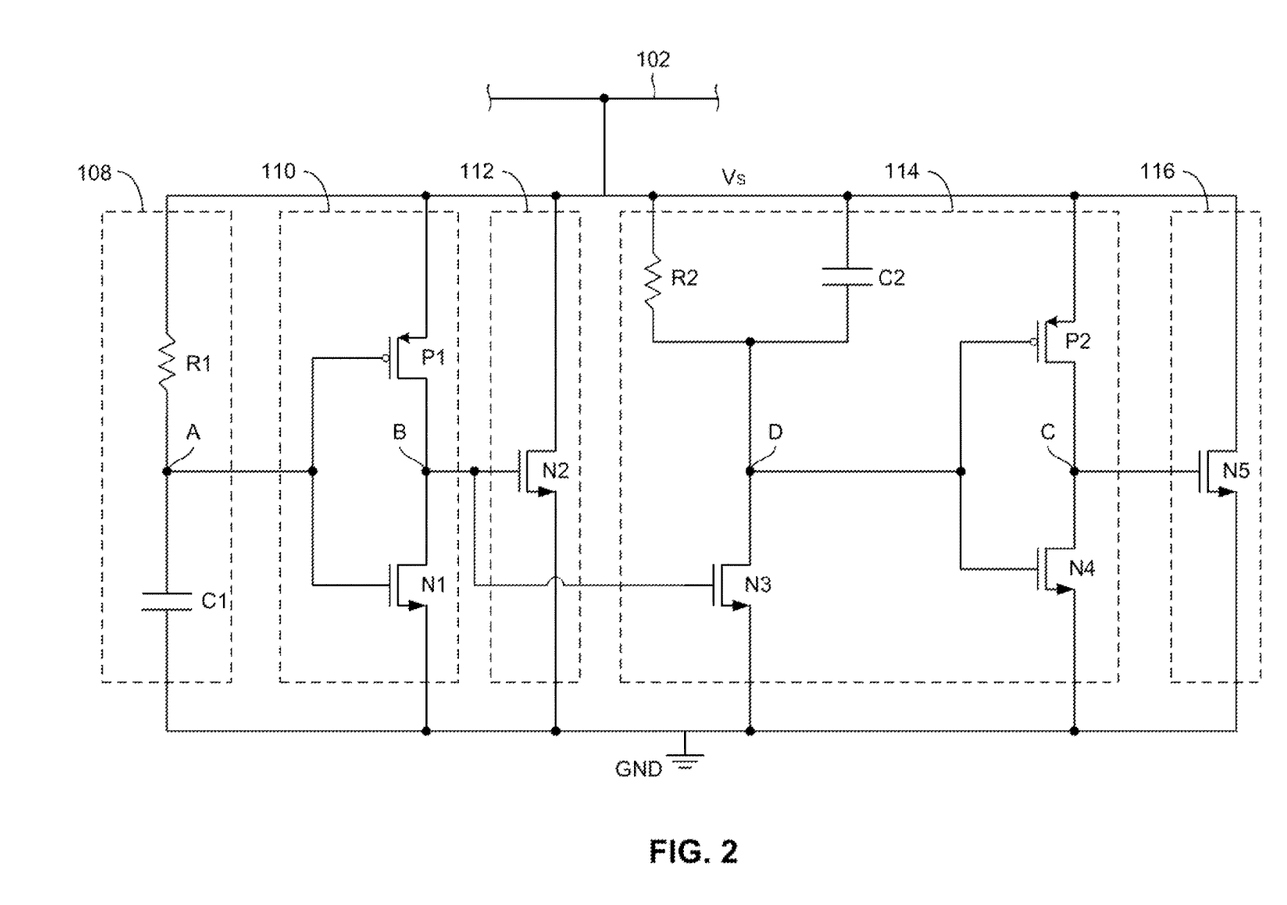
FIG. 2 is a circuit schematic of an example circuit configuration of the electrostatic discharge protection circuit of FIG. 1.

FIG. 2 shows a circuit schematic of an example circuit configuration of the ESD protection circuit 100 shown in FIG. 1. The ESD detection circuitry 108 may include a series connection of a first resistor R1 and a first capacitor C1. The first resistor R1 and the first capacitor C1 may each have a first end connected together at node A. In addition, the first resistor R1 may have a second end connected to the supply line 102, and the first capacitor C1 may have a second end connected to the ground reference GND.

The first activation circuitry 110 may comprise first inverter circuitry that includes a first p-type metal-oxide-semiconductor ("PMOS") transistor P1 and a first n-type metal-oxide-semiconductor ("NMOS") transistor N1. The first PMOS transistor P1 may include a source terminal connected to the supply line 102 and a drain terminal connected to node B. The first NMOS transistor N1 may include a source terminal connected to the ground reference GND and a drain terminal also connected to node B. Gate terminals of each of the first PMOS transistor P1 and the first NMOS transistor N1 may be connected to node A. The first PMOS transistor P1 and the first NMOS transistor N1 may form an inverter circuit in that when a level of the voltage at node A corresponds to a logic low value, the first PMOS transistor P1 may be turned on and the first NMOS transistor N1 may be turned off to pull up the voltage generated at node B to a level corresponding to a logic high value. Alternatively, when the level of the voltage at node A corresponds to a logic high value, the first PMOS transistor P1 may be turned off and the first NMOS transistor N1 may be turned on to pull down the voltage generated at node B to a level corresponding to a logic low value.

The first discharge path 112 may include a second NMOS transistor N2 having a drain terminal connected to the supply line 102 and a source terminal connected to the ground reference GND. In addition, a gate terminal of the second NMOS transistor N2 may be connected to node B. The second NMOS transistor N2 may be referred to as a clamp transistor since it may operate to clamp a level of voltage generated on the supply line 102 to an identified safe voltage level that is not likely to cause damage to the supply voltage source and/or destination devices 104, 106. In some examples, the identified safe voltage level may be below and/or correspond to a breakdown voltage level. A voltage above the breakdown voltage level may burn and/or cause a short in the transistor, such as between two terminals of the transistor and/or between a terminal and the substrate.

The first activation voltage generated at node B may be applied to the gate terminal of the second NMOS transistor N2. A level of the first activation voltage may determine whether the second NMOS transistor N2 is either turned on or turned off. When the second NMOS transistor N2 is turned on, the first discharge path 112 may be configured in the activated state and charge on the supply line 102 may flow through the second NMOS transistor N2 to the ground reference GND. Alternatively, when the second NMOS transistor N2 is turned off, the first discharge path 112 may be configured in the deactivated state and charge on the supply line 102 may be prevented from flowing through the second NMOS transistor N2 to the ground reference GND.

The second activation circuit 114 may include a parallel connection of a second resistor R2 and a second capacitor C2. First ends of each of the second resistor R2 and the second capacitor C2 may be connected to the supply line 102, and second ends of each of the second resistor R2 and the second capacitor C2 may be connected together at a node D.

The second activation circuit 114 may also include a third NMOS transistor N3 that has a drain terminal connected to node D and a source terminal connected to the ground reference GND. In addition, a gate terminal of the third NMOS transistor N3 may be connected to the gate terminal of the second NMOS transistor N2 and the drain terminals of the first PMOS and NMOS transistors P1, N1 at node B.

The second activation circuit 114 may further include inverter circuitry that includes a second PMOS transistor P2 and a fourth NMOS transistor N4. The second PMOS transistor P2 may include a source terminal connected to the supply line 102 and a drain terminal connected to node C. The fourth NMOS transistor N4 may include a source terminal connected to the ground reference GND and a drain terminal also connected to node B. Gate terminals of each of the first PMOS transistor P1 and the first NMOS transistor N1 may be connected to node A.

The second discharge path 116 may include a fifth NMOS transistor N5 having a drain terminal connected to the supply line 102 and a source terminal connected to the ground reference GND. In addition, a gate terminal of the fifth NMOS transistor N5 may be connected to node C. Like the second NMOS transistor N2 of the first discharge path 112, the fifth NMOS transistor N5 may be referred to as a clamp transistor since it may operate to clamp a level of voltage generated on the supply line 102 to an identified safe voltage level below a breakdown voltage level that is not likely to cause damage to the supply voltage source and/or destination devices 104, 106.

The second activation voltage generated at node C may be applied to the gate terminal of the fifth NMOS transistor N5. A level of the second activation voltage may determine whether the fifth NMOS transistor N5 is either turned on or turned off. When the fifth NMOS transistor N5 is turned on, the second discharge path 116 may be configured in the activated state and charge on the supply line 102 may flow through the fifth NMOS transistor N5 to the ground reference GND. Alternatively, when the fifth NMOS transistor N5 is turned off, the second discharge path 116 may be configured in the deactivated state and charge on the supply line 102 may be prevented from flowing through the fifth NMOS transistor N5 to the ground reference GND.

Prior to an ESD event, a level of the detection voltage generated between the supply line 102 and node A (or a voltage drop across the first resistor R1) may be relatively small (i.e., below a threshold voltage of the first PMOS transistor P1) such that the first PMOS transistor P1 is turned off. Depending on the voltage level at node A, the first NMOS transistor N1 may be either turned on or off. In either case, however, the level of the voltage at node B may be sufficiently low to cause each of the second and third NMOS transistors N2, N3 to be turned off With the third NMOS transistor N3 turned off, the level of the voltage at node D may be close enough to the level of the voltage on the supply line 102 such that the second PMOS transistor P2 is turned off. In turn, the level of the second activation voltage generated at node C may be sufficiently low to cause the fifth NMOS transistor N5 to be turned off. Accordingly, prior to an ESD event, both the first and the second discharge paths 112, 116 may be deactivated.

The series connection of the first resistor and capacitor R1, C1 may be responsive to a speed or frequency of voltage transients on the supply line 102. When a transient voltage is generated, the voltage on the supply line 102 may experience a change in voltage level. However, the capacitive characteristics of the first capacitor C1 may cause the change in voltage level of the voltage at node A to lag behind the level change on the supply line 102, which in turn may cause an increase in the level of the detection voltage generated between the supply line 102 and node A. Mathematically, the detection voltage generated between the supply line 102 and node A may correspond to a derivative of the transient voltage. As such, the faster or higher in frequency that the transient voltage is, the larger an initial level of the detection voltage is generated when the transient voltage initially occurs. Thereafter, the first capacitor C1 may begin to charge, causing the voltage level of the voltage at node A to increase and the detection voltage between the supply line 102 and node A to decrease. A resistance of the first resistor R1 and a capacitance of the first capacitor C1 may determine how fast the voltage at node A increases, and in turn how fast the detection voltage between the supply line 102 and node A decreases. As described below, the resistance of the first resistor R1 and the capacitance of the first capacitor C1 may determine a duration of the first timing window.

When an ESD event initially occurs, the initial spike or rise in the ESD voltage on the supply line 102 may occur fast enough to cause the detection voltage between the supply line 102 and node A to be initially generated at a sufficiently large level (e.g., above a detection level) to cause the first PMOS transistor P1 to turn on. In general, a transient voltage on the supply line 102 occurring fast enough to cause the first PMOS transistor P1 to turn on may be synonymous with the transient voltage occurring within the first timing window. Also, the first PMOS transistor P1 initially turning on may be synonymous with the first timing window initially opening.

After the first PMOS transistor P1 initially turns on, the voltage at node A may begin to rise according to the resistance and capacitance values of the first resistor and capacitor R1, C1, respectively. As the voltage at node A continues to rise, the detection voltage between the supply line 102 and node A may continually decrease until the detection voltage reaches a sufficiently small level to cause the first PMOS transistor P1 to turn off. The first PMOS transistor P1 turning off may be synonymous with the first timing window closing.

When the first timing window is open and the first PMOS transistor P1 is turned on, the first PMOS transistor P1 may pull up the first activation voltage generated at node B to a level that turns on the second NMOS transistor N2 and the third NMOS transistor N3. When the second NMOS transistor N2 is turned on, the first discharge path 112 is activated, and so charge accumulated on the supply line 102 may be discharged through the second NMOS transistor N2 to the ground reference GND. When the first timing window closes, the first PMOS transistor P1 may turn off, which in turn may cause the level of the first activation voltage to be sufficiently low to turn off the second NMOS transistor N2. Since the turning on and off of the second NMOS transistor N2 is determined by the turning on and off of the first PMOS transistor P1, then the first discharge path 112 is activated during the first timing window. As such, not only is the first timing window used to detect an ESD event, but it is also used to set a time duration during which charge is discharged through the first discharge path 112. Also, any delay between the initial rise or spike of the ESD voltage and the activation of the first discharge path 112 (i.e., the turning on of the second NMOS transistor N2) may be relatively short such that the first discharge path 112 may begin suppressing the ESD voltage before it can reach an undesirably high level.

In addition, when the ESD event initially occurs, an initial rise or spike in the ESD voltage level may cause an initial rise in the voltage level at node D via the second resistor R2. However, the first PMOS transistor P1 may turn on and pull up the level of the first activation voltage at node B shortly thereafter, which may cause the third NMOS transistor N3 to turn on and pull down the level of the voltage at node D down to the ground reference voltage level (i.e., 0 V). The second activation circuitry 114 may be considered to be initially activated when the third NMOS transistor N3 is turned on. Accordingly, the first activation circuitry 110 may activate both the first discharge path 112 and the second activation circuitry 114 when the first PMOS transistor P1 pulls up the first activation voltage to a level that turns on both the second NMOS transistor N2 and the third NMOS transistor N3.

When the third NMOS transistor N3 is turned on and the voltage at node D is pulled down to the ground reference voltage level, a voltage difference between the supply line 102 and node D may be sufficiently large to turn on the second PMOS transistor P2. When the first timing window closes and the first PMOS transistor P1 turns off, the resulting level of the first activation voltage may cause the third NMOS transistor N3 to also turn off With the third NMOS transistor N3 turned off, a level of the voltage at node D may begin to rise toward the voltage level on the supply line 102 via the parallel connection of the second resistor R2 and the second capacitor C2. The voltage at node D may continue to rise until the voltage difference between the voltage on the supply line 102 and the voltage at node D is sufficiently small to cause the second PMOS transistor P2 to turn off.

The second PMOS transistor P2 initially turning on may be synonymous with the second timing window initially opening, and the second PMOS transistor P2 turning off may be synonymous with the second timing window closing. How fast the level of the voltage at node D rises (and how fast the second timing window closes when the third NMOS transistor N3 turns off) may depend on the resistance of the second resistor R2 and the capacitance of the second capacitor C2. As such, the duration of the second timing window may depend at least in part on the resistance of the second resistor R2 and the capacitance of the second capacitor C2.

When the second timing window opens and the second PMOS transistor P2 is turned on, the second PMOS transistor P2 may pull up the second activation voltage generated at node C to a level that turns on the fifth NMOS transistor N5. When the fifth NMOS transistor N5 is turned on, the second discharge path 116 is activated, causing charge accumulated on the supply line 102 to be discharged through the fifth NMOS transistor N5 to the ground reference GND. When the second timing window closes, the second PMOS transistor P2 may turn off, which in turn may cause the level of the first activation voltage to be sufficiently low to turn off the fifth NMOS transistor N5. Since the turning on and off of the fifth NMOS transistor N5 is determined by the turning on and off of the second PMOS transistor P2, then the second discharge path 116 is activated during the second timing window.

The resistance of the second resistor R2 and the capacitance of the second capacitor C2 may be set to respective values that cause the second timing window to be open and the second discharge path 116 to be activated for a sufficient duration after the first timing window closes. In this way, after the first timing window closes and the first discharge path 112 is deactivated, the ESD protection circuit 100 still has a discharge path activated to suppress the ESD voltage, should the ESD event still be occurring when the first timing window closes.

In some examples of the circuit configuration of the ESD protection circuit 100 shown in FIG. 2, a ratio of a size (e.g., a gate width) of the fifth NMOS transistor N5 to a total size of the second and fifth transistors N2, N5 (e.g., a sum of the gate widths of the second and fifth NMOS transistors N2, N5) may be in a range of about 70%-80%, although other ratios may be possible.

Figure 3:
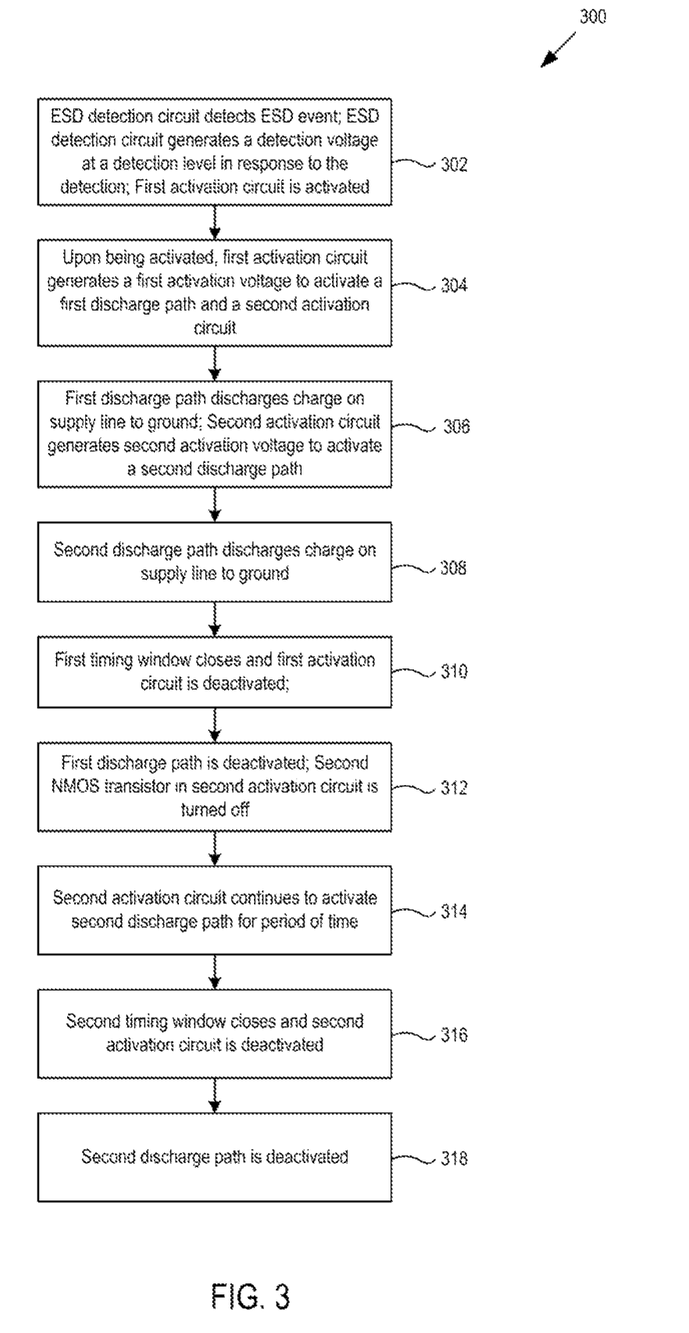
FIG. 3 is a flow chart of an example method of an electrostatic discharge protection circuit suppressing a voltage generated on a supply line in response to an electrostatic discharge event.

FIG. 3 shows a flow chart of an example method 300 of an ESD protection circuit suppressing a voltage generated on a supply line in response to an ESD event. At block 302, an ESD detection circuit of the ESD protection circuit may detect the ESD event on the supply line. The ESD detection circuit may detect the ESD event by detecting an initial rise of a level of the voltage on the supply line occurring within a first timing window. When the initial rise occurs within the first timing window, the ESD detection circuit may generate a detection voltage between a first node and the supply line at an initial detection level that is sufficiently large to activate a first activation circuit of the ESD protection circuit. The ESD detection circuit may include a first resistor and a first capacitor that are connected to each other at the first node. After the detection voltage is generated at the initial level, the voltage at the first node may begin to increase and the detection voltage between the supply line and first node may begin to correspondingly decrease in accordance with a resistance of the first resistor and a capacitance of the first capacitor.

At block 304, in response to being activated, the first activation circuit may generate a first activation voltage at a second node that activates a first discharge path and a second activation circuit. Activating the first activation circuit may include turning on a first PMOS transistor to pull up the first activation voltage generated at the second node to a level that activates the first discharge path and the second activation circuit. Activating the first discharge path may include turning on a first NMOS transistor of the first discharge path. Activating the second activation circuit may include turning on a second NMOS transistor, which may turn on a second PMOS transistor of the second activation circuit.

At block 306, in response to being activated, the first discharge path may discharge charge on the supply line to ground. In addition, in response to being activated, the second activation circuit may generate a second activation voltage at a third node to activate a second discharge path. For example, the second PMOS transistor of the second activation circuit may pull up the second activation voltage to a level that activates the second discharge path. In addition, turning on the second NMOS transistor may pull down a fourth node to ground, which in turn may cause the second PMOS transistor to pull up the second activation voltage. Also, activating the second discharge path may include turning on a third NMOS transistor of the second discharge path.

At block 308, in response to being activated, the second discharge path may discharge charge on the supply line to ground. For example, when the first NMOS transistor is turned on, charge on the supply line may flow through the first NMOS transistor to ground.

At block 310, the first timing window may close and the first activation circuit may be deactivated. In some example methods, the first timing window may close and the first activation circuit may be deactivated when the voltage at the first node rises to a level that causes the detection voltage generated between the supply line and the first node to be sufficiently small to turn off the first PMOS transistor of the first activation circuit.

At block 312, when the first timing window closes and the first activation circuit is deactivated, the first activation circuit may generate the first activation voltage at a level that deactivates the first discharge path. In addition, the level of the first activation voltage when the first timing window closes may turn off the second NMOS transistor.

At block 314, when the first timing window closes and the first activation circuit is deactivated, the second activation circuit may continue to activate the second discharge path. For example, when the first timing window closes, the second NMOS transistor may turn off and a level of the voltage generated at the fourth node may begin to rise in accordance with a resistance of a second resistor and a capacitance of a second capacitor that are connected in parallel with each other. Although the level of the voltage at the fourth node is rising, a difference between the level of the voltage on the supply line and the level of the voltage at the fourth node may remain sufficiently large to keep the second discharge path activated for a period of time. As a result, charge may continue to be discharged from the supply line to ground during this period of time.

At block 316, the level of the voltage at the fourth node may increase to a level that causes the voltage difference between the supply line and the fourth node to be sufficiently small to deactivate the second activation circuit and close the second timing window. At block 318, in response to the second timing window closing and the second activation circuit being deactivated, the second activation circuit may generate the second activation voltage at a level that deactivates the second discharge path. In response to be deactivated, charge on the supply line may no longer be discharged to ground via the second discharge path.

Figure 4:
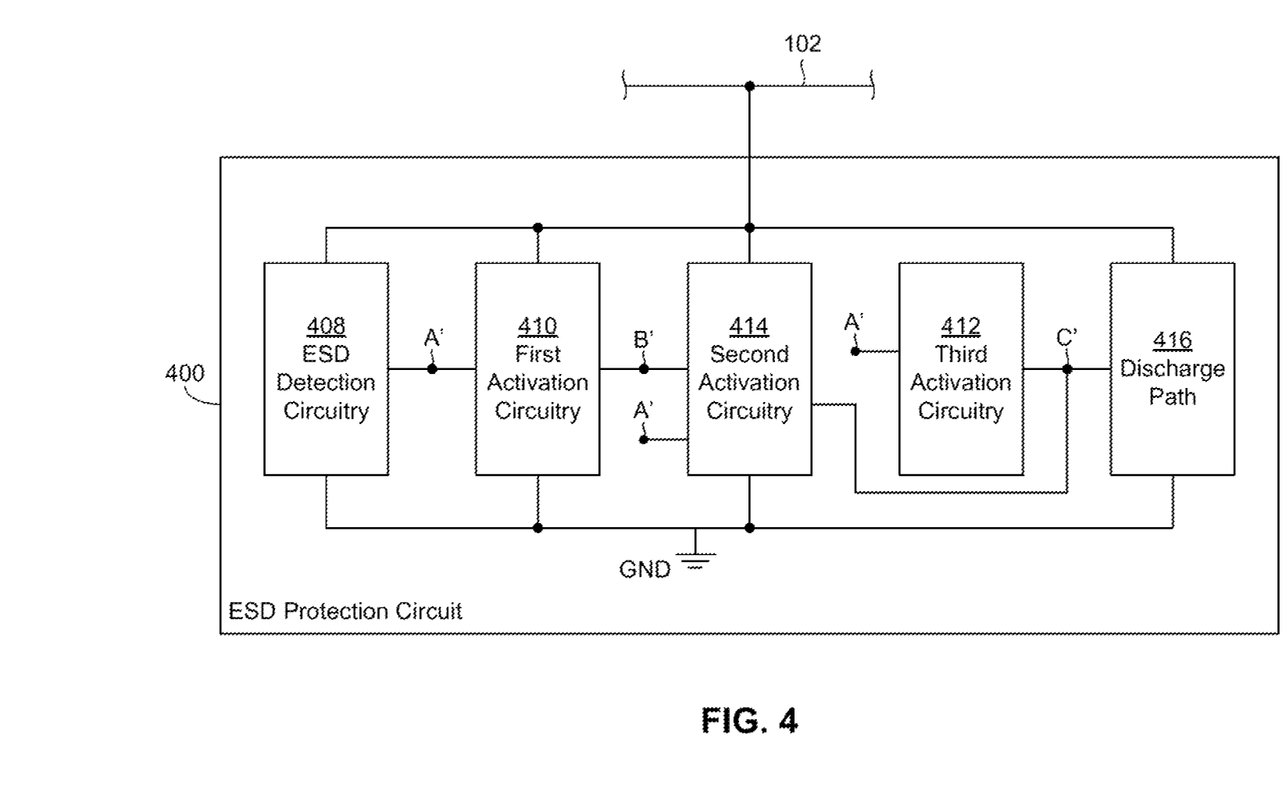
FIG. 4 is a block diagram of another example electrostatic discharge protection circuit coupled to a supply line.

FIG. 4 shows a block diagram of a second example ESD protection circuit 400 that may be coupled to the supply line 102. In contrast to the first ESD protection circuit 100 of FIG. 1, the second ESD protection circuit 400 of FIG. 4 may include a single discharge path rather than two discharge paths. Also, rather than use the detection voltage generated by the ESD detection circuitry to activate the first activation circuitry to, in turn, activate the first of the two discharge paths, the second ESD protection circuit 400 of FIG. 4 may use the detection voltage to activate third activation circuitry to, in turn, activate the same discharge path that is activated with the second activation circuitry. The third circuitry may keep the discharge path activated until a first time period closes. Similar to the first ESD protection circuit 100, the first activation circuitry of the second ESD circuit 400 may activate the second activation circuitry, which in turn, may activate the discharge path until a second time period closes. The first time period may begin before the second time period, and the second time period may end after the first time period. As such, like the first ESD protection circuit 100, the second ESD protection circuit 400 may use two time periods to discharge charge in response to an ESD event. However, in contrast to the first ESD protection circuit 100, the second ESD protection circuit 400 may use a single discharge path to discharge the charge.

In further detail, the ESD protection circuit 400 may include ESD detection circuitry 408 that, like the ESD detection circuitry 108, is configured to detect whether a transient voltage on the supply line 102 occurs within a first timing window or time period. If it does, then the ESD detection circuitry 408 may generate a voltage at a node A' with respect to ground that yields a detection voltage between the supply line 102 and node A' that is above a detection level. The detection voltage being above the detection level may activate first activation circuitry 410 and third activation circuitry 412. Prior to the detection, a level of the detection voltage may be below the detection level such that each of the first activation circuitry 410 and the third activation circuitry 412 may be deactivated.

In some example configurations, the ESD detection circuitry 408, like the ESD detection circuitry 108, may be configured as a low pass filter or exhibit low pass filter characteristics. If the frequency of the transient voltage is high enough to be indicative of an ESD voltage, then the low pass filter characteristics of the ESD detection circuitry 408 may "reject" the transient voltage and generate a relatively low voltage at node A' such that the voltage difference between the supply line 102 and node A' is above the detection level to activate the first activation circuitry 410. Alternatively, if the frequency of the transient voltage is too slow to be indicative of an ESD voltage, then the low pass filter characteristics of the ESD detection circuitry 408 may "pass" the transient voltage and generate a relatively high voltage at node A' such that the voltage difference between the supply line 102 and node A' is below the detection level.

As shown in FIG. 4, the ESD protection circuit 400 may include a single discharge path 416 that is configured to transition between an activated state and a deactivated state. When activated (or configured in the activated state), the discharge path 416 may effectively operate as a short circuit and couple the supply line 102 to the ground reference GND. As a result, charge accumulated on the supply line 102 may discharge to the ground reference GND via the discharge path 416. The discharge of the charge through the first discharge path 112 may suppress the level of the ESD voltage on the supply line 102. Alternatively, when deactivated (or configured in the deactivated state), the discharge path 416 may effectively operate as an open circuit between the supply line 102 and the ground reference GND. When configured in the deactivated state, charge accumulated on the supply line 102 may not discharge to the ground reference GND via the first discharge path 112.

When the detection voltage generated by the ESD detection circuit 408 at node A' is above the detection level, the third activation circuitry 412 may be activated and in response, generate a first activation voltage (relative to the ground reference GND) at a node C' at a level that activates the discharge path 416. Alternatively, when the ESD detection circuitry 408 generates the detection voltage at node A' below the detection level, then the third activation circuitry 412 may be deactivated, and response, generate a first activation voltage at node C' at a level that deactivate the discharge path 416.

In addition, when activated, the first activation circuitry 410 may generate a second activation voltage (relative to the ground reference GND) at a node B'. As shown in FIG. 1, the first activation voltage generated at node B' may be provided to second activation circuitry 414. When the first activation circuitry 410 is activated in response to the detection voltage being generated above the detection level, the first activation circuitry 410 may generate the second activation voltage at a level that activates the second activation circuitry 414.

When the second activation circuitry 414 is activated, the second activation circuitry 114 may generate the first activation voltage at node C'. Accordingly, both the second activation circuitry 414 and the third activation circuitry 412 may be used to activate the discharge path 416. That is, when both or only one of the second and third activation circuitries 412, 414 are activated, the first activation voltage generated at node C' may be generated at a level that activates the discharge path 416. Alternatively, when both the second activation circuitry 414 and the third activation circuitry 412 are deactivated, then the discharge path 416 may be deactivated.

When the ESD detection circuitry 408 detects an ESD event by detecting a transient voltage on the supply line 102 that occurs within a first timing window, the ESD detection circuitry 408 may generate the detection voltage between the supply line 102 and node A' above the detection level during the first timing window. When the first timing window closes (i.e., the first time period expires), the detection voltage may no longer be generated above the detection level. As such, the first activation circuitry 410 and the third activation circuitry 412 may be activated during the first timing window and may then be deactivated when the first timing window closes. The third activation circuitry 412 being activated during the first timing window may cause the discharge path 416 to be activated during the first timing window to discharge charge on the supply line 102 to the ground reference GND.

Similar to the second activation circuitry 114 of FIG. 1, the second activation circuitry 414 of FIG. 4 may be activated during a second timing window or for a second time period. In turn, during the second timing window, the discharge path 416 may be activated to discharge charge on the supply line 102 to the ground reference GND. In general, the first timing window may begin before the second timing window begins such that the third activation circuitry 412 may be activated to cause the discharge path 416 begin discharging charge on the supply line 102 before the second activation circuitry 414 is activated to cause the discharge path 116 begin discharging. In addition, the second timing window may end after the first timing window ends. As such, when the third activation circuitry 412 stops activating the discharge path 416 when the first timing window closes, and the discharge path 416 may continue to discharge charge because the second timing window has not yet closed and the second activation circuitry 414 may still be activated. Use of the two timing windows to activate a discharge path—a first window that opens shortly but quickly for ESD detection and a second window that stays open after the first window closes—may allow the ESD protection circuit 400 to start suppressing the ESD voltage as early as possible and also to suppress the ESD voltage for an overall longer duration of an ESD event compared to other ESD protection circuit configurations that utilize only a single time window or period for ESD suppression.

Figure 5:
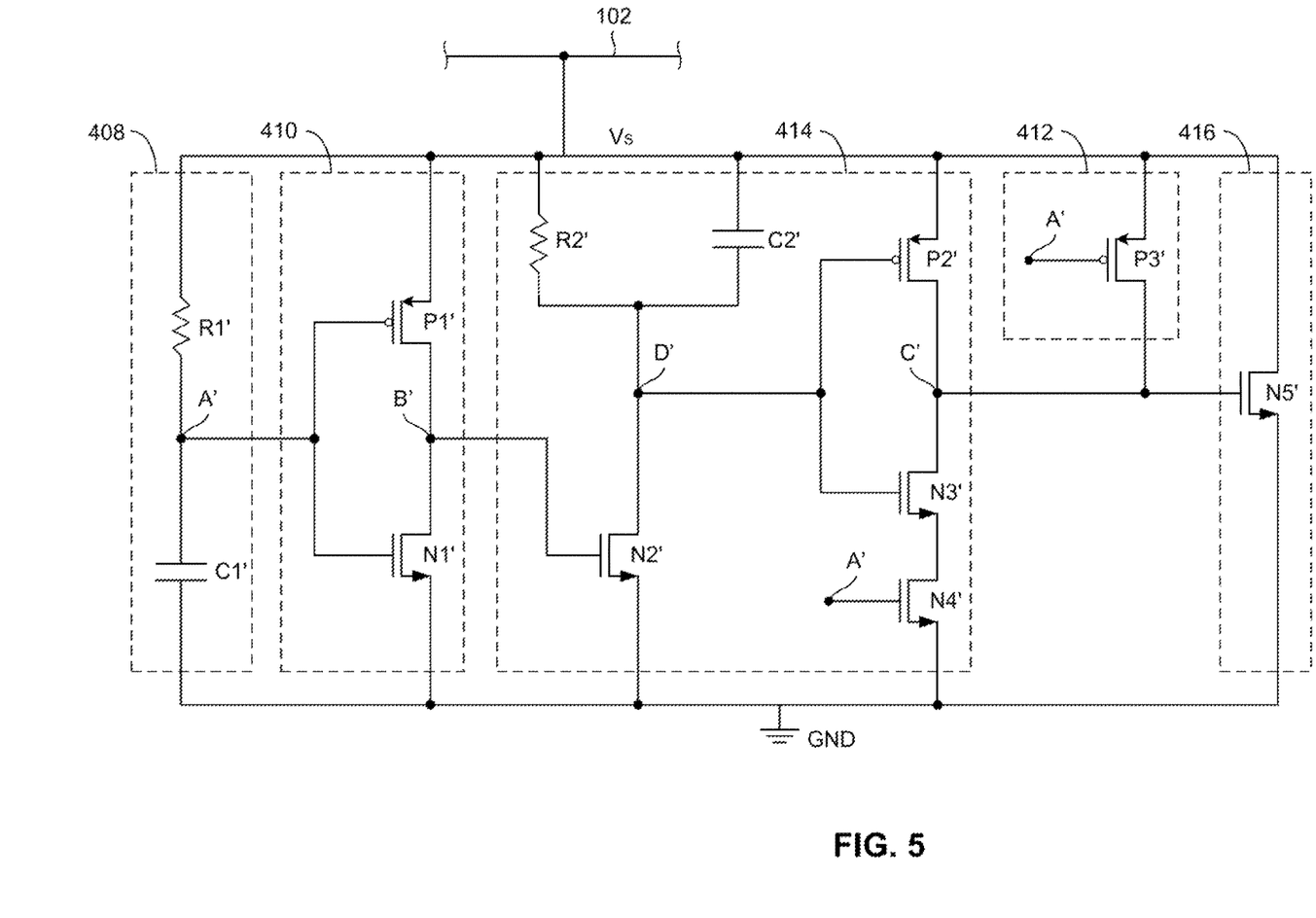
FIG. 5 is a circuit schematic of an example circuit configuration of the electrostatic discharge protection circuit of FIG. 4.

FIG. 5 shows a circuit schematic of an example circuit configuration of the ESD protection circuit 400 shown in FIG. 4. Like, the ESD detection circuitry 108 of FIG. 1, the ESD detection circuitry 408 may include a series connection of a first resistor R1' and a first capacitor C1'. The first resistor R1' and the first capacitor C1' may each have a first end connected together at node A'. In addition, the first resistor R1' may have a second end connected to the supply line 102, and the first capacitor C1' may have a second end connected to the ground reference GND.

In addition, like the first activation circuitry 110 of FIG. 1, the first activation circuitry 410 may include first inverter circuitry that includes a first PMOS transistor P1' and a first NMOS transistor N1'. The first PMOS transistor P1' may include a source terminal connected to the supply line 102 and a drain terminal connected to node B'. The first NMOS transistor N1' may include a source terminal connected to the ground reference GND and a drain terminal also connected to node B'. Gate terminals of each of the first PMOS transistor P1' and the first NMOS transistor N1' may be connected to node A'. The first PMOS transistor P1' and the first NMOS transistor N1' may form an inverter circuit. When a level of the voltage at node A' is at a logic low value, the first PMOS transistor P1' and the first NMOS transistor N1' may operate to pull up the voltage generated at node B' to a logic high level, and when the level of the voltage at node A' is at a logic high value, the first PMOS transistor P1' and the first NMOS transistor N1' may operate to pull down the voltage generated at node B' to a logic low level.

In addition, like the second activation circuit 114 of FIG. 2, the second activation circuit 414 may include a parallel connection of a second resistor R2' and a second capacitor C2'. First ends of each of the second resistor R2' and the second capacitor C2' may be connected to the supply line 102, and second ends of each of the second resistor R2' and the second capacitor C2' may be connected together at a node D'.

The second activation circuit 414 may also include a second NMOS transistor N2' that has a drain terminal connected to node D' and a source terminal connected to the ground reference GND. In addition, a gate terminal of the second NMOS transistor N2' may be connected to the drain terminals of the first PMOS and NMOS transistors P1', N1' at node B'.

The second activation circuit 414 may further include inverter circuitry that includes a second PMOS transistor P2' and a third NMOS transistor N3'. The second PMOS transistor P2' may include a source terminal connected to the supply line 102 and a drain terminal connected to node C'. The third NMOS transistor N3' may include a drain terminal also connected to node C'. In addition, gate terminals of the second PMOS transistor P2' and the third NMOS transistor N3' may be connected together at node D'. The second activation 414 may also include a fourth NMOS transistor N4' connected in series with the third NMOS transistor N3'. In particular, a drain terminal of the fourth NMOS transistor N4' may be connected to a source terminal of the third NMOS transistor N3'. Also, a source terminal of the fourth NMOS transistor N4' may be connected to the ground reference GND. Additionally, a gate terminal of the fourth NMOS transistor N4' may be connected to node A' and configured to receive the detection voltage. As explained in further detail below, the fourth NMOS transistor N4' may connected in series with the third NMOS transistor N3' in order to eliminate contention at node C' between the third NMOS transistor N3' and the third activation circuitry 412.

The discharge path 416 may include a fifth NMOS transistor N5' having a drain terminal connected to the supply line 102 and a source terminal connected to the ground reference GND. In addition, a gate terminal of the fifth NMOS transistor N5' may be connected to node C'. Like the NMOS transistors N2, N5 of the first discharge paths 112, 116 of FIG. 2, the fifth NMOS transistor N5' of the discharge path 416 may be referred to as a clamp transistor since it may operate to clamp a level of voltage generated on the supply line 102 to an identified safe voltage level below a breakdown voltage level that is not likely to cause damage to the supply voltage source and/or destination devices 104, 106.

The first activation voltage generated at node C' may be applied to the gate terminal of the fifth NMOS transistor N5'. A level of the first activation voltage may determine whether the fifth NMOS transistor N5' is either turned on or turned off. In particular, when the first activation voltage is above a threshold voltage of the fifth transistor N5' (or at a logic high level), the fifth NMOS transistor N5' may be turned on, and when the first activation voltage is below the threshold voltage (or at a logic low level), the fifth NMOS transistor N5' may be turned off.

When the fifth NMOS transistor N5' is turned on, the discharge path 416 may be configured in the activated state and charge on the supply line 102 may flow through the fifth NMOS transistor N5' to the ground reference GND. Alternatively, when the fifth NMOS transistor N5' is turned off, the discharge path 416 may be configured in the deactivated state and charge on the supply line 102 may be prevented from flowing through the fifth NMOS transistor N5' to the ground reference GND.

The third activation circuitry 412 may include a third PMOS transistor P3' that includes a source terminal connected to the supply line 102, a drain terminal connected to node C', and a gate terminal connected to node A' and configured to receive the detection voltage. The third activation circuitry 412 may be activated when the detection voltage causes the third PMOS transistor P3' to be turned on, and may be deactivated when the detection voltage causes the third PMOS transistor P3' to be turned off.

Prior to an ESD event, a level of the detection voltage generated between the supply line 102 and node A' (or a voltage drop across the first resistor R1') may be relatively small (i.e., below threshold voltages of the first and third PMOS transistor P1', P3') such that third PMOS transistor P3' is turned off. Hence, prior to an ESD event, the third activation circuitry 412 is not activating the discharge path 416. Also, with the detection voltage generated between the supply line 102 and node A' being relatively small, the first PMOS transistor P1' is also turned off. Depending on the voltage level at node A', the first NMOS transistor N1' and the fourth NMOS transistor N4' may be either turned on or off. In either case, however, the level of the voltage at node B' may be sufficiently low to cause the second NMOS transistor N2' to be turned off. With the second NMOS transistor N2' turned off, the level of the voltage at node D' may be close enough to the level of the voltage on the supply line 102 such that the second PMOS transistor P2' is turned off. Since both the second and third PMOS transistors P2' and P3' are turned off prior to an ESD event, then the level of the first activation voltage generated at node C' may be sufficiently low to cause the fifth NMOS transistor N5' to be turned off and in general, the discharge path 416 to be deactivated.

Similar to operation of the ESD detection circuitry 108, when an ESD event initially occurs, an initial spike or rise in the ESD voltage on the supply line 102 may occur fast enough to cause the detection voltage between the supply line 102 and node A' to be initially generated at a sufficiently large level (e.g., above a detection level) to cause the first and third PMOS transistors P1', P3' to turn on. In general, a transient voltage on the supply line 102 occurring fast enough to cause the first and third PMOS transistors P1', P3' to turn on may be synonymous with the transient voltage occurring within the first timing window. Also, the first and third PMOS transistors P1', P3' initially turning on may be synonymous with the first timing window initially opening.

After the first and third PMOS transistors P1', P3' initially turn on, the voltage at node A' may begin to rise according to the resistance and capacitance values of the first resistor and capacitor R1', C1', respectively. As the voltage at node A' continues to rise, the detection voltage between the supply line 102 and node A' may continually decrease until the detection voltage reaches a sufficiently small level to cause the first PMOS transistor P1' to turn off. The first PMOS transistor P1' turning off may be synonymous with the first timing window closing.

When the third PMOS transistor P3' turns on, the third PMOS transistor P3' may pull up the first activation voltage at node C' to a logic high level to cause the fifth NMOS transistor N5' to turn on and begin discharging charge on the supply line 102. In this way, the discharge path 416 is activated when the first timing window opens. Subsequently, when the first timing window closes, the third PMOS transistor P3' may turn off, and in turn, the discharge path 416 may no longer be activated based on the third activation circuitry 412. Since the turning on and off of the third NMOS transistor N3' is determined by the first timing window, then not only is the first timing window used to detect an ESD event, but it is also used to set a time duration during which the third activation circuitry 412 activates the discharge path 416. Also, any delay between the initial rise or spike of the ESD voltage and the activation of the discharge path 412 (i.e., the turning on of the third PMOS transistor P3' and in turn the fifth NMOS transistor N5') may be relatively short such that the discharge path 416 may begin suppressing the ESD voltage before it can reach an undesirably high level.

In addition, the circuit configuration of the second activation circuitry 414 may operate similarly to that of the second activation circuitry 114 of FIG. 2. When the first timing window is open and the first PMOS transistor P1 is turned on, the first PMOS transistor P1 may pull up the second activation voltage generated at node B' to a level that turns on the second NMOS transistor N2'. When the ESD event initially occurs, an initial rise or spike in the ESD voltage level may cause an initial rise in the voltage level at node D' via the second resistor R2'. However, the first PMOS transistor P1' may turn on and pull up the level of the first activation voltage at node B' shortly thereafter, which may cause the second NMOS transistor N2' to turn on and pull down the level of the voltage at node D' down to the ground reference voltage level (i.e., 0 V).

The second activation circuitry 114 may be considered to be initially activated when the second NMOS transistor N2' is turned on. Accordingly, the first activation circuitry 410 may activate the second activation circuitry 414 when the first PMOS transistor P1' pulls up the second activation voltage at node B' to a level that turns on the second NMOS transistor N2'.

When the second NMOS transistor N2' is turned on and the voltage at node D' is pulled down to the ground reference voltage level, a voltage difference between the supply line 102 and node D' may be sufficiently large to turn on the second PMOS transistor P2'. When the first timing window closes and the first and third PMOS transistors P1', P3' turn off, the resulting level of the second activation voltage at node B' may cause the second NMOS transistor N2' to also turn off With the second NMOS transistor N2 ' turned off, a level of the voltage at node D' may begin to rise toward the voltage level on the supply line 102 via the parallel connection of the second resistor R2' and the second capacitor C2'. The voltage at node D' may continue to rise until the voltage difference between the voltage on the supply line 102 and the voltage at node D' is sufficiently small to cause the second PMOS transistor P2' to turn off.

The second PMOS transistor P2' initially turning on may be synonymous with the second timing window initially opening, and the second PMOS transistor P2' turning off may be synonymous with the second timing window closing. How fast the level of the voltage at node D' rises (and how fast the second timing window closes when the second NMOS transistor N2' turns off) may depend on the resistance of the second resistor R2' and the capacitance of the second capacitor C2'. As such, the duration of the second timing window may depend at least in part on the resistance of the second resistor R2' and the capacitance of the second capacitor C2'.

When the second timing window opens and the second PMOS transistor P2' is turned on, the second PMOS transistor P2' may pull up the second activation voltage generated at node C' to a level that turns on the fifth NMOS transistor N5'. However, due to the delay between the start of the ESD event and when the second PMOS transistor P2' turns on, the third PMOS transistor P3', with its gate being directly connected to node A', may have already turned on and started activating the discharge path 416 by the time that the second PMOS transistor P2' turns on. Yet, like the circuit configuration of the second activation circuitry 114 of FIG. 2, the resistance of the second resistor R2' and the capacitance of the second capacitor C2' may be set to respective values to cause the second timing window to be open for a sufficient duration after the first timing window closes. In this way, after the first timing window closes and the third activation circuitry 412 is deactivated, the ESD protection circuit 400, the discharge path 416 is still activated to suppress the ESD voltage, should the ESD event still be occurring when the first timing window closes. Subsequently, when the second timing window closes, the second PMOS transistor P2' may turn off. Since the first window may be closed and the third PMOS transistor P3' may be turned off when the second timing window closes, then both the second and third activation circuitries 414, 412 may be deactivated with the second timing window closes. As such, when the second timing window closes and the second PMOS transistor P2' turns off, the fifth NMOS transistor N5' may turn off, deactivating the discharge path 416.

One difference between the circuit configuration of the second activation circuitry 414 and that of the second activation circuitry 114 of FIG. 1 is the inclusion of the fourth NMOS transistor N4'. As previously described, when an ESD event occurs, there may be an initial rise of spike in the ESD voltage level occurring at node D' shortly before the second NMOS transistor N2' turns on and starts pulling down the voltage at node D'. The third NMOS transistor N3', in response to this initial increase in voltage, may want to turn on and start pulling down the level of the first activation voltage at node C'. However, when the ESD event first occurs, the third PMOS transistor P3' is to turn on in order to pull up the level of the first activation voltage at node C' so that the fifth NMOS transistor N5' turns on and starts discharging the charge on the supply line 102. Turning on the third NMOS transistor N3' would undesirably cause contention at node C' and hinder the ability of the third PMOS transistor P3' to activate the discharge path 416 right when the ESD detection circuitry 408 detects the ESD event. However, by connecting the gate terminal of the fourth NMOS transistor N4' to node A', the initial level of the detection voltage when an ESD event occurs may turn off the fourth NMOS transistor N4', which in turn may prevent the third NMOS transistor N3' from pulling down the level of the first activation voltage at node C' despite the initial spike or rise at node D' when the ESD event starts. As such, the fourth NMOS transistor N4', by being turned off when an ESD event occurs, may allow the third PMOS transistor P3' to turn on to activate the discharge path 416 without being affected by contention at node C' due to the third NMOS transistor N3' being turned on.

Figure 6:
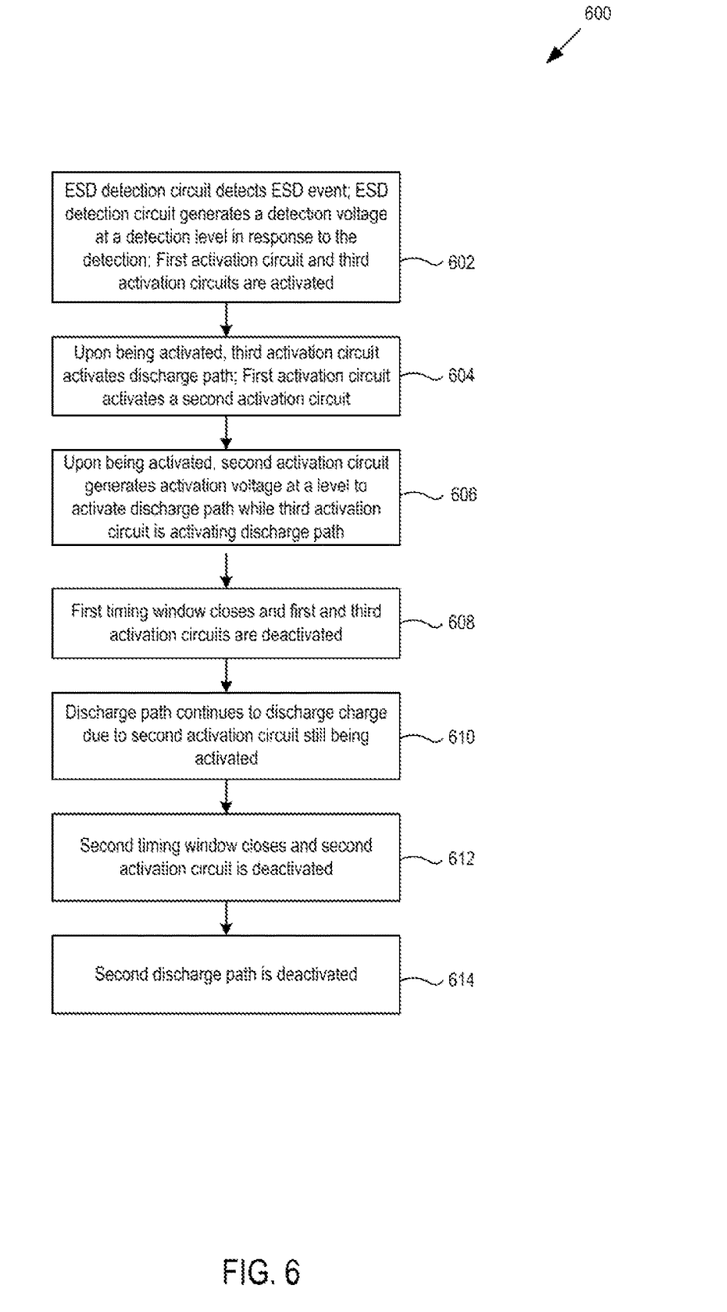
FIG. 6 is a flow chart of another example method of an electrostatic discharge protection circuit suppressing a voltage generated on a supply line in response to an electrostatic discharge event.

FIG. 6 shows a flow chart of another example method 600 of an ESD protection circuit suppressing a voltage generated on a supply line in response to an ESD event. At block 602, an ESD detection circuit of the ESD protection circuit may detect the ESD event on the supply line. The ESD detection circuit may detect the ESD event by detecting an initial rise of a level of the voltage on the supply line occurring within a first timing window. When the initial rise occurs within the first timing window, the ESD detection circuit may generate a detection voltage between a first node and the supply line at an initial detection level that is sufficiently large to activate a first activation circuit and a third activation circuit of the ESD protection circuit. The ESD detection circuit may include a first resistor and a first capacitor that are connected to each other at the first node. After the detection voltage is generated at the initial level, the voltage at the first node may begin to increase and the detection voltage between the supply line and first node may begin to correspondingly decrease in accordance with a resistance of the first resistor and a capacitance of the first capacitor.

At block 604, in response to being activated, the third activation circuit may generate a first activation voltage at a second node that activates a discharge path, causing charge on the supply line to be discharged to ground. Activating the third activation circuit may include turning on a first PMOS transistor to pull up the first activation voltage generated at the second node to a level that activates the discharge path. Activating the discharge path may include turning on a first NMOS transistor of the discharge path. In addition, in response to being activated, the first activation circuit may generate a second activation voltage at a third node that activates a second activation circuit. Activating the first activation circuit may include turning on a second PMOS transistor to pull up the second activation voltage generated at the third node to a level that activates the second activation circuit. Activating the second activation circuit may include turning on a second NMOS transistor, which may turn on a second PMOS transistor of the second activation circuit.

At block 606, in response to being activated, the second activation circuit may contribute to generating the first activation voltage, along with the third activation circuitry, at the third node to activate the discharge path. In addition, turning on the second NMOS transistor may pull down a fourth node to ground, which in turn may cause the second PMOS transistor to generate the first activation voltage to activate the discharge path.

At block 608, the first timing window may close and the first and third activation circuits may be deactivated. In some example methods, the first timing window may close and the first and third activation circuits may be deactivated when the voltage at the first node rises to a level that causes the detection voltage generated between the supply line and the first node to be sufficiently small to turn off the PMOS transistors of the first and third activation circuits.

At block 610, when the first timing window closes and the first and third activation circuits are deactivated, the second activation circuit may continue to activate the discharge path. For example, when the first timing window closes, the second NMOS transistor may turn off and a level of the voltage generated at the fourth node may begin to rise in accordance with a resistance of a second resistor and a capacitance of a second capacitor that are connected in parallel with each other. Although the level of the voltage at the fourth node is rising, a difference between the level of the voltage on the supply line and the level of the voltage at the fourth node may remain sufficiently large to keep the discharge path activated for a period of time. As a result, charge may continue to be discharged from the supply line to ground during this period of time.

At block 612, the level of the voltage at the fourth node may increase to a level that causes the voltage difference between the supply line and the fourth node to be sufficiently small to deactivate the second activation circuit and close the second timing window. At block 614, in response to the second timing window closing and the second activation circuit being deactivated, the second activation circuit may generate the first activation voltage at a level that deactivates the discharge path. In response to be deactivated, charge on the supply line may no longer be discharged to ground via the discharge path.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

We claim:

1. A circuit comprising:
   discharge path circuitry coupled to a supply line and a ground reference, the discharge path circuitry comprising a first discharge path circuit and a second discharge path circuit;
   a detection circuit configured to:
      detect an ESD event occurring on the supply line;
      generate a detection voltage above a detection level for a first time period in response to detection of the ESD event; and
   activation circuitry comprising a first activation circuit and a second activation circuit,
   wherein the first activation circuit is configured to activate both the first discharge path circuit and the first activation circuit for the first time period in response to detection of the ESD event, and
   wherein the second activation circuit, in response to being activated by the first activation circuit, is configured to cause the second discharge path circuit to discharge charge for a second time period that ends after the first time period ends.

2. The circuit of claim 1, wherein the first discharge path circuit comprises a first transistor and the second activation circuit comprises a second transistor, wherein the first activation circuit is configured to generate an activation voltage at an activation level that turns on the first transistor to cause the first discharge path circuit to discharge charge and the activation level turns on the second transistor to activate the second activation circuit.

3. The circuit of claim 2, wherein the second activation circuit further comprises a node connected to the second transistor, wherein the first activation circuit is further configured to generate the activation voltage below the activation level when the first time period expires, wherein the first and second transistors are configured to turn off in response to the activation voltage being generated below the activation level, and wherein when the second transistor turns off, a voltage generated at the node causes the second discharge path circuit to discharge charge for the second time period.

4. The circuit of claim 3, wherein the voltage generated at the node causes the second discharge path to be deactivated upon expiration of the second time period.

5. The circuit of claim 1, wherein the first activation circuit is configured to begin causing the first discharge path circuit to discharge charge before the second activation circuit is configured to begin causing the second discharge path to discharge charge.

6. A circuit comprising:
   discharge path circuitry;
   a detection circuit configured to:
      detect an ESD event occurring on a supply line;
      generate a detection voltage above a detection level for a first time period in response to detection of the ESD event; and
   activation circuitry comprising a first activation circuit, a second activation circuit, and a third activation circuit,
   wherein when the detection circuit generates the detection voltage above the detection level:
      the third activation circuit is configured to cause the discharge path circuitry to discharge charge for the first time period;
      the first activation circuit is configured to activate the second activation circuit; and the second activation circuit, upon being activated, is configured to cause the discharge path circuitry to discharge charge for the second time period.

7. The circuit of claim 6, wherein the third activation circuit, upon being activated, is configured to generate an activation voltage at an activation level on a node to cause the discharge path circuitry to discharge charge, and wherein the second activation circuit, upon being activated, is configured to generate the activation voltage at the activation level on the node to cause the discharge path circuitry to discharge the charge.

8. The circuit of claim 7, wherein the second activation circuit is configured to maintain the activation voltage on the node at the activation level until the second time period ends when the first time period ends and the third activation circuit is no longer configured to generate the activation voltage at the activation level.

9. The circuit of claim 7, wherein the third activation circuit comprises a first transistor to pull up the activation voltage on the node, wherein the second activation circuit comprises a second transistor configured to turn off when the detection circuit generates the detection voltage above the detection level, and wherein the second transistor, when turned off, prevents a third transistor of the second activation circuit from pulling down the activation voltage on the node.

10. The circuit of claim 9, wherein the node comprises a first node, and wherein the detection circuit is configured to generate the detection voltage between a second node and the supply line, and wherein the first transistor and the second transistor each have a terminal coupled to the second node.

11. A circuit comprising:
a first discharge path and a second discharge path, each configured to, when activated, discharge charge accumulated on a supply line to a ground reference;
a detection circuit configured to generate a detection voltage above a detection level in response to detection of an electrostatic discharge event (ESD) event on the supply line;
activation circuitry comprising a first activation circuit and a second activation circuit,
wherein the first activation circuit is configured to be activated when the detection circuit generates the detection voltage above the detection level, and when activated, generate a first activation voltage at a first activation level to activate each of the first discharge path and the second activation circuit, and
wherein the second activation circuit, upon being activated, is configured to generate a second activation voltage at a second activation level to activate the second discharge path.

12. The circuit of claim 11, wherein the first activation circuit is configured to generate the first activation voltage at the first activation level during a timing window.

13. The circuit of claim 12, wherein the detection circuit comprises a resistor and a capacitor, and wherein a duration of the timing window is based on a resistance of the resistor and a capacitance of the capacitor.

14. The circuit of claim 12, wherein the detection circuit is configured to generate the detection voltage to deactivate the first activation circuit when the timing window closes, wherein the first activation circuit, upon being deactivated, is configured to generate the first activation voltage at a deactivation level and provide the first activation voltage at the deactivation level to each of the first discharge path and the second activation circuit, wherein the first discharge path is configured to be deactivated in response to receipt of the first activation voltage at the deactivation level, and wherein the second activation circuit is configured to remain activated to activate the second discharge path for a time period in response to receipt of the second activation voltage at the deactivation level.

15. The circuit of claim 14, wherein the second activation circuit comprises a resistor connected in parallel with a capacitor, and wherein a duration of the time period that the second activation circuit is configured to remain activated depends on a resistance of the resistor and a capacitance of the capacitor.

16. The circuit of claim 11, wherein the first discharge path comprises a first transistor having a first gate width and the second discharge path comprises a second transistor having a second gate width, and wherein a ratio of the second width to a sum of the first gate width and the second gate width corresponds to a percentage in a range of between 70-80%.

17. A circuit comprising:
a first activation circuit configured to generate a first activation voltage for a first time period in response to an electrostatic discharge (ESD) event;
a second activation circuit configured to generate a second activation voltage for a second time period in response to the first activation voltage, the second time period dependent on a resistor connected in parallel with a capacitor; and
discharge path circuitry configured to discharge charge on a supply line for the first time period in response to the first activation voltage and the second time period in response to the second activation voltage.

18. The circuit of claim 17, wherein the first activation circuit is configured to apply the first activation voltage to a first discharge path of the discharge path circuitry to cause the first discharge path to discharge charge for the first time period, and wherein the second activation circuit is configured to apply the second activation voltage to a second discharge path of the discharge path circuitry to cause the second discharge path to discharge charge for the second time period.

19. A circuit comprising:
a discharge path configured to activate to discharge charge on a supply line in response to an electrostatic discharge (ESD) event;
a first activation circuit configured to generate a first activation voltage for a first time period on a node that activates the discharge path to discharge the charge in response to the ESD event; and
a second activation circuit configured to:
generate a second activation voltage on the node on which the first activation voltage is generated for a second time period; and
maintain application of the second activation voltage on the node to activate the discharge path after the first time period expires until an end of a second time period.

* * * * *